United States Patent
Carnahan et al.

(10) Patent No.: US 10,377,929 B2
(45) Date of Patent: *Aug. 13, 2019

(54) VACUUM INFUSION ADHESIVE AND METHODS RELATED THERETO

(71) Applicant: Westech Aerosol Corporation, Suquamish, WA (US)

(72) Inventors: David W. Carnahan, Bremerton, WA (US); Robert R. Yuodelis, Port Orchard, WA (US); James C. Manlove, Port Orchard, WA (US)

(73) Assignee: Westech Aerosol Corporation, Suquamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,380

(22) Filed: Apr. 6, 2017

(65) Prior Publication Data

US 2017/0210955 A1   Jul. 27, 2017

Related U.S. Application Data

(63) Continuation of application No. 14/092,513, filed on Nov. 27, 2013, now Pat. No. 9,624,411, which is a continuation-in-part of application No. 13/174,852, filed on Jul. 1, 2011, now abandoned.

(60) Provisional application No. 61/360,910, filed on Jul. 1, 2010.

(51) Int. Cl.
| | | |
|---|---|---|
| *C09J 163/10* | (2006.01) | |
| *C09J 163/08* | (2006.01) | |
| *C09J 163/02* | (2006.01) | |
| *B29C 65/48* | (2006.01) | |
| *B29C 70/44* | (2006.01) | |
| *C08G 59/42* | (2006.01) | |
| *C09J 163/00* | (2006.01) | |
| *C09J 5/00* | (2006.01) | |
| *C09J 7/29* | (2018.01) | |
| *B29K 63/00* | (2006.01) | |
| *B29L 9/00* | (2006.01) | |

(52) U.S. Cl.
CPC ............. *C09J 163/10* (2013.01); *B29C 65/48* (2013.01); *B29C 65/4805* (2013.01); *B29C 70/443* (2013.01); *C08G 59/4253* (2013.01); *C09J 5/00* (2013.01); *C09J 7/29* (2018.01); *C09J 163/00* (2013.01); *B29K 2063/00* (2013.01); *B29K 2913/00* (2013.01); *B29L 2009/00* (2013.01); *C09J 2463/00* (2013.01)

(58) Field of Classification Search
None
See application file for complete search history.

(56) References Cited

U.S. PATENT DOCUMENTS

| | | |
|---|---|---|
| 3,791,983 A | 2/1974 | Maierson |
| 4,301,119 A | 11/1981 | Cobbs, Jr. et al. |
| 4,380,505 A | 4/1983 | Wittenhorst |
| 4,861,833 A | 8/1989 | Chasser et al. |
| 5,159,894 A | 11/1992 | Saidman et al. |
| 5,380,552 A | 1/1995 | George et al. |
| 5,444,112 A | 8/1995 | Carnahan |
| 5,480,925 A | 1/1996 | Masuzaki et al. |
| 5,711,484 A | 1/1998 | Blette et al. |
| 5,753,727 A | 5/1998 | Sato et al. |
| 6,216,752 B1 | 4/2001 | Bailey |
| 6,277,481 B1* | 8/2001 | Sugino ............... C08G 18/4063 428/221 |
| 6,376,070 B1 | 4/2002 | Nakasuga et al. |
| 6,723,273 B2 | 4/2004 | Johnson et al. |
| 8,148,474 B2 | 4/2012 | Ohama et al. |
| 9,624,411 B2* | 4/2017 | Carnahan ............... C09J 163/10 |
| 2002/0016420 A1 | 2/2002 | Zarnoch et al. |
| 2003/0090027 A1 | 5/2003 | Smirnova et al. |
| 2006/0276591 A1 | 12/2006 | Husemann et al. |
| 2008/0251202 A1 | 10/2008 | Eagle et al. |
| 2011/0256342 A1* | 10/2011 | Toshioka ............. C09J 133/068 428/119 |
| 2014/0091496 A1* | 4/2014 | Carnahan ............. B29C 70/443 264/261 |

OTHER PUBLICATIONS

Pilotdave, How the Vacuum Infusion Process Works. Body Kit Resources, Jan. 16, 2008, pp. 1-3, http://bodykits.wordpress/2008/01/16/how-the-vacuum-infusion-process-works/.
Burton, Bruce L., Amine Curing of Epoxy Resins: Options and Key Formulation Considerations, Jun. 1, 2006, pp. 1-12, http://www.pcimag.com/articles/85952-amine-curing-of-epoxy-resins-options-and-key-formulation-considerations.
3M Super 77 Multipurpose Adhesive Product Information, 2010, pp. 1-2, http://solutions.3m.com/wps/portal/3M/en_US/3M-Super-77/Super77/Spray Ahesive/Product-Information.
Official Communication for U.S. Appl. No. 13/174,852 dated Feb. 14, 2013.
Official Communication for U.S. Appl. No. 13/174,852 dated Jun. 13, 2013.
The Science and technology of Aerosol Packaging, Edited by J. Sciarra & L. Stoller (John Wiley & Sons, Inc., NY, NY, copyright 1974) pp. 137-141 (Feb. 1975).
P.A. Sanders, Principles of Aerosol Technology, (Van Nostrand Reinhold Company, NY, NY, copyright 1970) pp. 28-33, (May 1974).
http://web.archive/web/20031115182806/http://fibreglast.com/documents/361.pdf, Published Nov. 15, 2003.

* cited by examiner

*Primary Examiner* — Michael J Feely

(57) ABSTRACT

An epoxy adhesive that is adapted to enable spray delivery and seamless polymerization during epoxy resin vacuum infusion techniques is disclosed. The epoxy adhesive can include one or more epoxy resins and one or more solvents that are used to dissolve the one or more epoxy resins. An adduct, a tackifier, and fumed silica can also be added to the adhesive.

12 Claims, 4 Drawing Sheets

| DRY MATERIAL |
|---|
| ADHESIVE |
| CORE |

FIG. 1

Short Beam Shear Testing Results

| Type/Adhesive | Specimen Number | Thickness meters | Width meters | Length meters | Failure Load Newtons | Tau Critical Mpa | Average Mpa | Standard Deviation | | |
|---|---|---|---|---|---|---|---|---|---|---|
| Carbon/None | 1 | 0.003200 | 0.006789 | 0.020422 | 1780 | 61.61 | | | | |
| Carbon/None | 2 | 0.003200 | 0.006756 | 0.020422 | 1815 | 62.95 | | | | |
| Carbon/None | 3 | 0.003226 | 0.006782 | 0.020472 | 1781 | 61.05 | | | | |
| Carbon/None | 4 | 0.003200 | 0.006756 | 0.020523 | 1713 | 59.42 | | | | |
| Carbon/None | 5 | 0.003226 | 0.006782 | 0.020422 | 1713 | 58.38 | | | | |
| Carbon/None | 6 | 0.003175 | 0.006807 | 0.020422 | 1655 | 57.44 | | | | |
| Carbon/None | 7 | 0.003124 | 0.006833 | 0.020371 | 1672 | 58.75 | | | | |
| Carbon/None | 8 | 0.003315 | 0.006880 | 0.020396 | 1626 | 57.93 | | | | |
| Carbon/None | 9 | 0.003200 | 0.006758 | 0.020472 | 1715 | 59.46 | | | | |
| Carbon/None | 10 | 0.003226 | 0.006782 | 0.020398 | 1724 | 59.09 | 59.67 | 1.595 | Carbon/no adhesive | |
| Carbon/Infuzene Epoxy | 1A | 0.003124 | 0.006807 | 0.020472 | 1611 | 56.82 | | | | |
| Carbon/Infuzene Epoxy | 2A | 0.003124 | 0.006706 | 0.020422 | 1636 | 58.22 | | | | |
| Carbon/Infuzene Epoxy | 3A | 0.003175 | 0.006731 | 0.020447 | 1443 | 50.84 | | | | |
| Carbon/Infuzene Epoxy | 4A | 0.003124 | 0.006782 | 0.020472 | 1588 | 55.94 | | | | |
| Carbon/Infuzene Epoxy | 5A | 0.003175 | 0.006731 | 0.020447 | 1599 | 56.79 | | | | |
| Carbon/Infuzene Epoxy | 6A | 0.003099 | 0.006756 | 0.020447 | 1468 | 52.36 | | | | |
| Carbon/Infuzene Epoxy | 7A | 0.003124 | 0.006706 | 0.020447 | 1463 | 53.96 | | | | |
| Carbon/Infuzene Epoxy | 8A | 0.003150 | 0.006758 | 0.020447 | 1331 | 48.77 | | | | |
| Carbon/Infuzene Epoxy | 9A | 0.003175 | 0.006756 | 0.020447 | 1394 | 52.82 | | | | |
| Carbon/Infuzene Epoxy | 10A | 0.003175 | 0.006782 | 0.020422 | 1502 | 54.99 | 54.49 | 3.459 | Carbon/Infuzene Epoxy | |

Figure 3

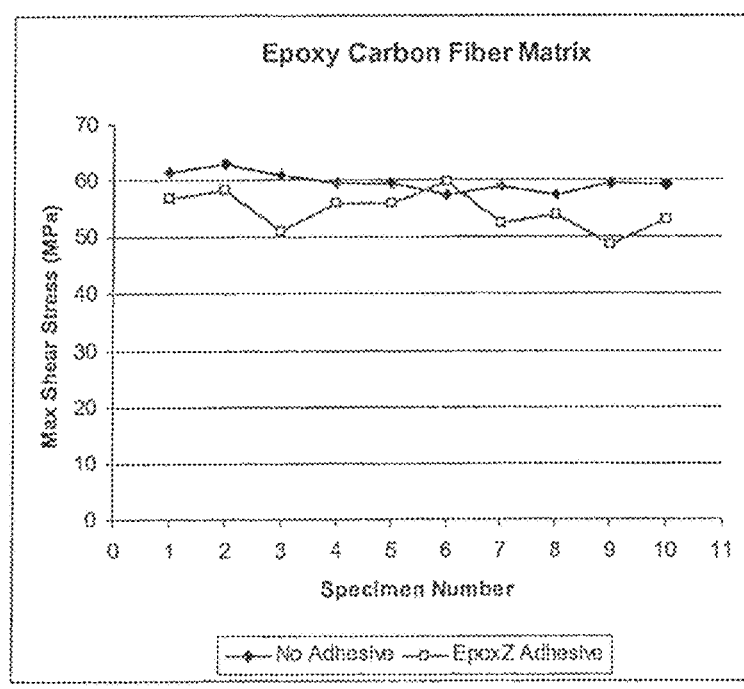

Figure 4

Short Beam Shear Testing Results

| Type/Adhesive | Specimen Number | Thickness meters | Width meters | Length meters | Failure Load Newtons | Tau Critical Mpa | Average Mpa | Standard Deviation | |
|---|---|---|---|---|---|---|---|---|---|
| Glass/None | 1 | 0.004597 | 0.008865 | 0.026518 | 3020 | 55.58 | | | |
| Glass/None | 2 | 0.004623 | 0.008890 | 0.026543 | 2958 | 53.98 | | | |
| Glass/None | 3 | 0.004623 | 0.008865 | 0.026568 | 2936 | 53.73 | | | |
| Glass/None | 4 | 0.004572 | 0.008763 | 0.026441 | 2903 | 54.46 | | | |
| Glass/None | 5 | 0.004547 | 0.008865 | 0.026594 | 2954 | 54.96 | | | |
| Glass/None | 6 | 0.004547 | 0.008865 | 0.026594 | 2789 | 51.90 | | | |
| Glass/None | 7 | 0.004547 | 0.008865 | 0.026594 | 2807 | 52.33 | | | |
| Glass/None | 8 | 0.004572 | 0.008890 | 0.026654 | 3025 | 55.81 | | | |
| Glass/None | 9 | 0.004521 | 0.008865 | 0.026594 | 2753 | 51.53 | | | |
| Glass/None | 10 | 0.004572 | 0.008865 | 0.026568 | 2975 | 55.07 | 53.93 | 1.555 | Glass/no adhesive |
| Glass/Infuzene Epoxy | 1A | 0.004597 | 0.008890 | 0.026568 | 2887 | 52.98 | | | |
| Glass/Infuzene Epoxy | 2A | 0.004597 | 0.008839 | 0.026518 | 2971 | 54.84 | | | |
| Glass/Infuzene Epoxy | 3A | 0.004623 | 0.008839 | 0.026594 | 3051 | 56.61 | | | |
| Glass/Infuzene Epoxy | 4A | 0.004597 | 0.008890 | 0.026518 | 3007 | 55.18 | | | |
| Glass/Infuzene Epoxy | 5A | 0.004597 | 0.008865 | 0.026594 | 2945 | 54.19 | | | |
| Glass/Infuzene Epoxy | 6A | 0.004623 | 0.008839 | 0.026543 | 2865 | 52.58 | | | |
| Glass/Infuzene Epoxy | 7A | 0.004623 | 0.008839 | 0.026543 | 2887 | 52.99 | | | |
| Glass/Infuzene Epoxy | 8A | 0.004597 | 0.008839 | 0.026568 | 2918 | 53.86 | | | |
| Glass/Infuzene Epoxy | 9A | 0.004572 | 0.008890 | 0.026594 | 2887 | 53.27 | | | |
| Glass/Infuzene Epoxy | 10A | 0.004572 | 0.008890 | 0.026568 | 2980 | 54.49 | 54.09 | 1.141 | Glass/Infuzene Epoxy |
| Glass/3M77 | 1B | 0.004470 | 0.008865 | 0.026594 | 1375 | 26.01 | | | |
| Glass/3M77 | 2B | 0.004521 | 0.008890 | 0.026594 | 1544 | 28.82 | | | |
| Glass/3M77 | 3B | 0.004674 | 0.008839 | 0.026594 | 1496 | 27.21 | | | |
| Glass/3M77 | 4B | 0.004572 | 0.008915 | 0.026594 | 1708 | 31.43 | | | |
| Glass/3M77 | 5B | 0.004547 | 0.008890 | 0.026518 | 1382 | 25.83 | | | |
| Glass/3M77 | 6B | 0.004623 | 0.008865 | 0.026568 | 1428 | 26.11 | | | |
| Glass/3M77 | 7B | 0.004547 | 0.008865 | 0.026568 | 1192 | 22.18 | | | |
| Glass/3M77 | 8B | 0.004597 | 0.008915 | 0.026568 | 1326 | 24.26 | | | |
| Glass/3M77 | 9B | 0.004521 | 0.008865 | 0.026518 | 1624 | 30.38 | | | |
| Glass/3M77 | 10B | 0.004521 | 0.008814 | 0.026568 | 1205 | 22.86 | 26.49 | 3.059 | Glass/3M77 |

Figure 5

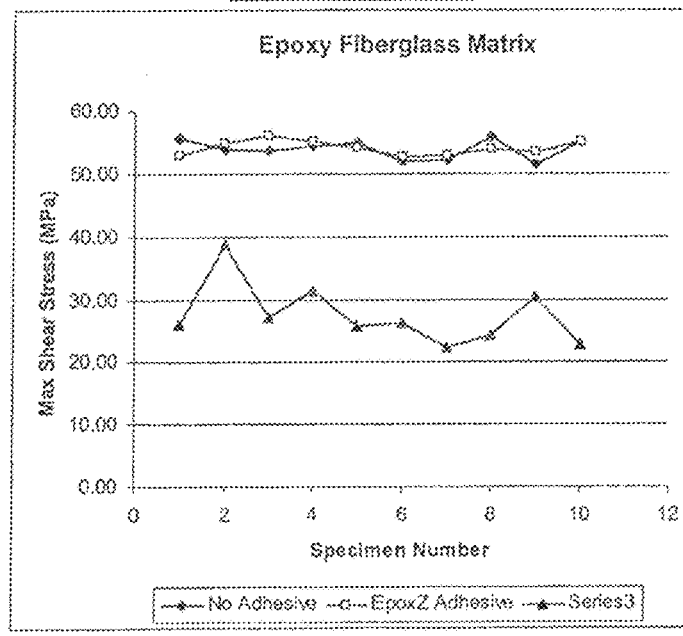

Figure 6

VACUUM INFUSION ADHESIVE AND METHODS RELATED THERETO

CROSS-REFERENCE AND PRIORITY CLAIM TO RELATED APPLICATIONS

The present U.S. Non-Provisional Patent Application is a continuation of U.S. application Ser. No. 14/092,513, filed on Nov. 27, 2013, which is a continuation-in-part (CIP) of U.S. application Ser. No. 13/174,852, filed on Jul. 1, 2011 (now abandoned), which claims priority to and the benefit of United States Provisional Patent Application entitled "Vacuum Infusion Adhesion and Methods Related Thereto," filed on Jul. 1, 2010, and having assigned Ser. No. 61/360,910. Each of the above-referenced applications is incorporated by reference herein in their entireties.

FIELD OF THE INVENTION

The present disclosure relates generally to adhesives, and more particularly, to an adhesive adapted to enable seamless polymerization during epoxy resin vacuum infusion techniques.

BACKGROUND

Vacuum infusion is a process wherein vacuum pressure is used to drive resin into a laminate structure. Typically, selected mats of random or woven fabric, such as fiberglass, carbon fiber, KEVLAR®, foam core, or the like, are prepared and enclosed in a vacuum bag. Resin and catalyzer are then infused therein, typically after vacuum is drawn, and polymerization occurs after completion of an optimized curing period and at a selected temperature. The polymerization forms a rigid three-dimensional network structure defined by linear chains with cross-links therebetween.

Positioning of laminate layers is essential to allow for a properly formed structure. Therefore, spray adhesive is sometimes applied to generally hold essentially dry layers in position prior to and during the vacuum infusion process, especially for sloped assemblies, such as large boat hulls. That is, an effective adhesive must be able to hold many layers of reinforcing fabric in a vertical aspect to satisfy the need. Unfortunately, many spray adhesives that are commonly utilized in such manner form a discernible interface, weakening the overall integrity of the cured structure, acting as a contaminant in the matrix. That is, premature failure of the cured structure may result at the area(s) of adhesive application, where resin structure is interrupted.

Resins such as polyester, vinyl ester, or epoxy may be utilized for vacuum infusion. Epoxy resins, however, have better relative mechanical properties and typically produce composite structures that are stronger and more heat tolerant, with a high strength/weight ratio. Epoxy, a structural or engineering adhesive well recognized for excellent adhesion properties and high heat and chemical resistance, finds application as a coating, adhesive and in composite materials, such as those using carbon fiber and fiberglass reinforcements, as discussed further herein. Epoxy is a copolymer comprising resin and hardener. Typically, monomers or short chain polymers with an epoxide group at one end define a resin. Hardener mixes with the resin and its amine groups, such as of the polyamine monomer triethylenetetramine, to form a covalent bond with the epoxide group of the resin. In such manner, a rigid structure is defined with crosslinking therebetween, wherein the modified epoxy adheres to surfaces by forming strong polar bonds therewith.

A majority of epoxy resin is produced from epichlorohydrin and bisphenol-A, wherein bisphenol-A, or phenolacetone, is formed from 2 mole phenol and 1 mole acetone. Epichlorohydrin is a mixture of propylene and chlorine, with free radical substitution at the double bond resulting in allylchloride as a main product, which may be further treated with layer separation and processing. Typically, for liquid epoxy resin, the bisphenol-A,

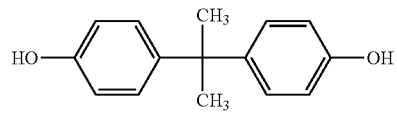

and epichlorhydrin,

are combined with sodium hydroxide, NaOH, to preferably form epichlorohydrin

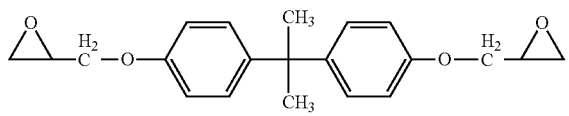

releasing Na⁺ and Cl⁻. The reaction thus removes unreacted phenol and acetone and attaches two glycidyl groups to the ends of the bisphenol-A to create a standard epoxy resin. The resulting epoxy prepolymer,

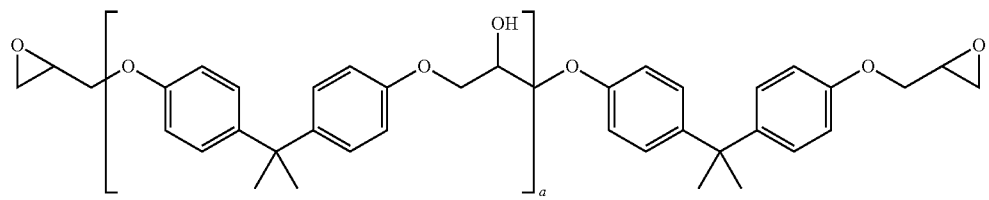

is reacted with amine compounds for cross-linking.

As noted, spray adhesives typically utilized in the vacuum infusion process to hold laminates together generally influence and negatively influence the successful formation of strong polar bonds between the epoxy and the laminate surface(s). Interruption of the epoxy resin's cross-linking may also occur, further contributing to the weakened interface. That is, as noted, the typical adhesive interface is generally weaker than the rest of the structure, compromising the integrity of the materials formed. Therefore, it is readily apparent that there is need for a vacuum infusion adhesive that allows for secure placement of laminates and that polymerizes with epoxy resin, thereby creating a seamless cured structure and thereby avoiding the above-discussed disadvantages.

BRIEF SUMMARY OF THE INVENTION

Briefly described, in a preferred embodiment, the presently disclosed adhesive and methods related thereto overcome the above-mentioned disadvantages and meet the recognized need by enabling seamless polymerization during epoxy resin vacuum infusion techniques and by avoiding creation of any weakened adhesive interface.

According to its major aspects and broadly stated, in its preferred form, the present disclosure features a vacuum infusion adhesive that may be utilized to hold laminate layers together in a vertical aspect until enclosed in the vacuum barrier. The adhesive includes properties that cross-link with epoxy resin present in the curing laminate structure. Generally, laminate layers are assembled, reinforced with carbon fiber or the like, wherein these dry materials are held together on structural or mold surfaces by the vacuum infusion adhesive. The laminate layers can then be infused with resin and the resin can be cured resulting in a single, structurally uninterrupted formation. Unlike other known adhesives, the presently described adhesive, preferably delivered as a spray, does not interfere with the curing process of the epoxy resin, but in fact cross links and hardens along with the epoxy to form a single integrated structure therewith, delivering unexpectedly improved shear strength in both fiberglass and carbon fiber applications.

More specifically, the preferred adhesive of the present disclosure comprises bisphenol A/epichlorohydrin epoxy resins optionally mixed with tackifiers and adducts to form an adhesive, wherein preparation as an aerosol spray allows for application to fiberglass or carbon fiber cloth, for example, and wherein the adhesive formula facilitates use in the vacuum infusion process when epoxy resins are cured with amine hardeners.

In general, one aspect of the present disclosure features an adhesive composition comprising a solvent borne epoxy resin optionally coupled with suitable tackifiers to effectively hold the layers of reinforcement together after the carrier solvent evaporates, and until the matrix can be placed under vacuum and infused.

In one implementation, the disclosed composition is sprayed as an adhesive on substrates such as fiberglass or carbon fiber fabrics, then the layers to be sealed are placed into a vacuum bag and epoxy resin plus hardener is infused under vacuum.

In another implementation, the epoxy base of the adhesive makes it compatible with the infusing epoxy resin and hardener, so that the adhesive polymerizes seamlessly with the epoxy resin to prevent flaws in the cured epoxy, thereby delivering unexpectedly improved results by incorporating a major component of the resin, e.g. epoxy, into a sprayable adhesive, thereby facilitating the incorporation thereof into the resin matrix without necessitating the addition of additional or extraneous compounds into the structure of the matrix.

In another implementation, the carrier solvent is acetone, whereby exemption from volatile organic compound (VOC) regulation is realized, and wherein evaporation is quick.

In another implementation, a small amount of adduct, or amine hardener is utilized to pre-polymerize a portion of the epoxy.

In another implementation, the adhesive dissolves in the infusing epoxy resin.

In another implementation, the adhesive of the present disclosure is utilized for vacuum infusion of epoxy fiberglass.

In another implementation, the composition of the present disclosure comprises epoxy resins in acetone, wherein tackifiers, adducts, and/or hardeners are optionally incorporated to provide for a tacky and/or sticky nature for the composition following evaporation of the acetone.

In another implementation, the uncured epoxy resin reacts with diamine hardeners.

In another implementation, the adhesive cross links with vacuum infusion epoxy resin.

In another implementation, one or more tackifiers, adducts, and/or hardeners are added to enhance adhesive properties of epoxy resin dissolved in acetone.

In another implementation, adducts may be added to the adhesive formula to further influence epoxy resin reactants therewith.

In another implementation, selectively compatible tackifiers may be introduced to influence tack of the epoxy adhesive.

In one implementation, the composition is a mixture of two or more epoxy resins.

In another implementation, the composition is a mixture of three epoxy resins, wherein one of the three epoxy resins has a carboxyl terminated butadiene nitrile (CTBN) adduct, thereby improving toughness, elasticity, and tack of the epoxy portion.

In another implementation, one or more tackifiers in the form of aliphatic C-5 or aliphatic C-5/C-9 aromatic modified hydrocarbon resins are introduced to the composition.

In another implementation, a selectively increased volume of acetone is added to the composition carrier solvent volume of acetone to reduce viscosity and thin out the adhesive, for enhanced spray can delivery of the adhesive.

In another implementation, fumed silica may be introduced to help maintain a uniform spray and/or to promote improved short beam shear strength.

In another aspect, the present disclosure features a laminate structure, including a core layer having a first surface and a second surface, a cross-linking adhesive applied on at least one of the surfaces, and a reinforcing layer, such as fiberglass or carbon fiber, in contact with the at least one surface adapted with adhesive, wherein the resulting laminate structure is a cohesive resin cured unit.

In one implementation, the resin is bisphenol A/epichlorohydrin resin and the adhesive is a bisphenol A/epichlorohydrin adhesive.

One feature and advantage of the adhesive of the present disclosure is its ability to form a superior interface between laminate layers, wherein the interface is essentially incorporated into the formed epoxy-cured structure because the adhesive base is premised upon epoxy, as is the resin.

Another feature and advantage of the adhesive of the present disclosure and methods related thereto is not only the achievement of increased strength of vacuum infusion results over alternatives, with maximum tensile shear strength, but also that the adhesive remains low VOC (volatile organic components) and HAP's free (no components from EPA's hazardous air pollutants list).

Another feature and advantage of the adhesive of the present disclosure is that the adhesive begins as an independent component introduced into the vacuum infusion process for the purpose of holding the layers together until sealed within the vacuum bag, but the adhesive completes the process as a non-independent matrix member that is cross-linked with the epoxy resin.

Still another feature and advantage of the adhesive of the present disclosure is that the adhesive safely fuses laminating materials to structural core surfaces, providing superior holding prior to sealing in the vacuum bag, and further dissolves and becomes a structural component curing with the epoxy resins thereafter.

These and other features, capabilities and advantages will become more apparent to one skilled in the art from the following description and claims when read in light of the accompanying drawings.

BRIEF DESCRIPTION OF THE DRAWINGS

The present disclosure will be better understood by reading the Detailed Description of the Preferred and Alternate Embodiments with reference to the accompanying drawing figures, in which like reference numerals denote similar structure and refer to like elements throughout, and in which:

FIG. 1 illustrates typical layers implemented in a typical embodiment of the process;

FIG. 3 illustrates a first tabular presentation of initial adhesive formula performance testing with carbon fiber;

FIG. 4 illustrates a first graphical presentation of initial adhesive formula performance testing with carbon fiber;

FIG. 5 illustrates a second tabular presentation of further adhesive formula performance testing with fiberglass; and FIG. 6 illustrates a second graphical presentation of further adhesive formula performance testing with fiberglass.

DETAILED DESCRIPTION OF THE INVENTION

Figure 2:
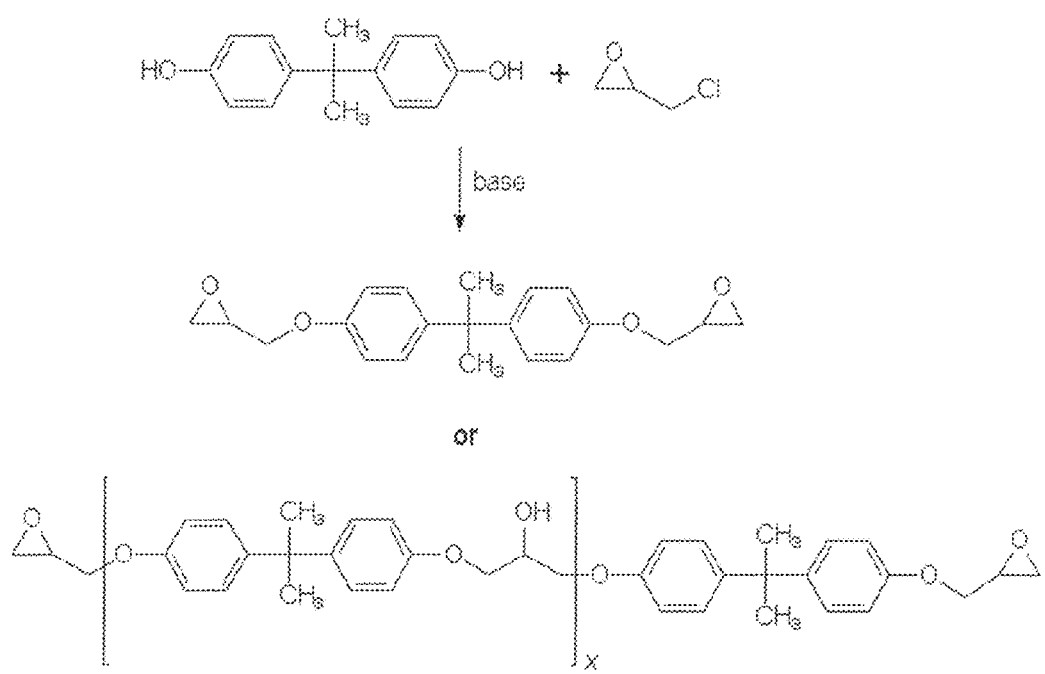
FIG. 2 illustrates an embodiment of typical epoxy resin cross-linking reactions.

In describing the preferred and alternate embodiments of the present disclosure, as illustrated in the FIGS. 1-6 and/or described herein, specific terminology is employed for the sake of clarity. The disclosure, however, is not intended to be limited to the specific terminology so selected, and it is to be understood that each specific element includes all technical equivalents that operate in a similar manner to accomplish similar functions.

Manufacturers of epoxy-fiberglass or epoxy-carbon fiber structures using the infusion process need an adhesive product to hold fabrics together until infusion and curing is complete, but also need an adhesive product that does not act as a contaminant in the resin matrix. Having previously successfully developed INFUZENE®, an adhesive comprising reactive SBS block co-polymer, hydrocarbon tackifying resin, cyclohexane and acetone that forms a cross-linked and hardened matrix along with vinyl ester resins, as described in U.S. Pat. No. 7,682,478B1, a new investigation was undertaken to develop an improved adhesive for use in epoxy resin systems rather than vinyl ester resin systems. To that end, a lengthy and complex series of trial and error experiments were conducted to conceive, analyze, identify, and create a new combination of materials that, when formulated together, would deliver heretofore unavailable results relative to vacuum infusion epoxy laminates, and according to an entirely original perspective relative to the previous vinyl ester resin adhesive. The goal, and after many modifications directed to improvement of particular characteristics including stickiness, the result was a discovery of an adhesive formulation with an epoxy-resin compatible base that would allow for efficient spray application for preparation of vacuum infusion epoxy laminates, that would be able to hold many layers of reinforcing fabric in a vertical aspect, and that would integrate into the cured epoxy laminate structure rather than form a potentially weakening interface, all with low VOC emissions.

Referring now to FIGS. 3 and 4, an adhesive formula was discovered with strength recovery of about 91% in preliminary testing. This strength recovery estimate was estimated during short beam shear testing by dividing the average measured strength of ten samples of an epoxy cured carbon fiber laminate structure with the adhesive applied by the average measured strength of ten samples of an epoxy cured carbon fiber laminate structure without the adhesive (as shown, 54.59 mPA/59.67 mPA=0.915). Those skilled in the art recognize results above 90% are very good for such short beam shear testing comparisons, and further testing, discussed hereinbelow, further confirmed the unexpectedly minimal impact of the adhesive on the epoxy cured laminate structure.

Figure 1:
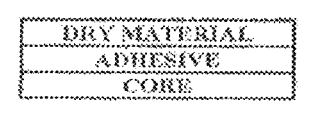

Referring now to FIGS. 1-2, the vacuum infusion laminate adhesive holds laminate layers together as epoxy resin is driven into a laminate structure. The adhesive comprises properties that cross-link with epoxy resin as it cures. Generally, the laminate layers include the assembly of epoxy resin reinforced with fiberglass and/or carbon fiber. Present infusion molding used to fabricate epoxy resin structures is improved with the use of the adhesive and the methods related thereto described herein.

The presently described technique encapsulates carbon fiber and/or fiberglass with epoxy resin while the resin cures, resulting in superior structural strength while allowing for low VOC emissions. The presently described process enables the use of epoxy adhesive to hold components in place in a vertical aspect while the laminate is bagged and subsequently infused with epoxy resin under vacuum. Cross linkable adhesive enables the creation of strong connections between laminate layers, wherein the adhesive preferably cures with epoxy resin and becomes an integral part of the cured structure, as discussed further herein. During curing, low shrinkage is observed. In addition, maximum tensile shear strength may be obtained.

In a typical embodiment, the adhesive is enclosed within a spray can and is applied to hold dry materials together and onto structural surfaces, ultimately curing with the epoxy resin to result in a single, uninterrupted structural formation. In particular, the adhesive is applied onto the surface of a laminate layer that is contacted with a second layer surface, optionally covered with adhesive, to form the laminate. For example, the adhesive is sprayed onto the surface of each reinforcing layer (e.g., glass, carbon fiber, fiberglass, KEVLAR®) and core layer (e.g., foam) as a matrix is assembled. No more adhesive than is necessary is applied. An excess amount of adhesive can affect the finished strength of the cured product. The layers are applied as fast as a crew can work, as the carrier solvent (e.g., acetone) will evaporate almost immediately. The matrix is porous so residual solvent will disappear when a vacuum is applied, if any is left. Experimentally, the rate of application is determined by weighing a piece of substrate and applying the spray adhesive to it on the scale. In practice, the application rate can be adjusted by the operator who is experienced in visually judging the amount being applied.

The rate of application for the adhesive is from 15 to 50, from 15 to 30, or from 15 to 20 grams per square meter as measured wet. Less than 15 grams per square meter may result in poor adhesion. In particular, if the application rate is 16.5 grams per square meter as measured wet and the adhesive contains 49.4% epoxy resin, the epoxy resin applied to the substrate is 8.2 grams per square meter.

After formation of the laminate using the adhesive, the laminate is subjected to a vacuum by, for example, encapsulating the laminate in a bag connected to a compressor or vacuum eductor. The laminate is then infused with an epoxy resin, which is typically the same as used in the adhesive, using methods known in the art. For example, when the laminate is in a vacuum bag, the epoxy resin is driven into the vacuum bag to infuse the laminate with epoxy resin. The epoxy resin can then be cured. The cured resin is cross-linked and hardened with the adhesive. A catalyst system for curing the epoxy resin can be initiated prior to driving the resin into the bag. Curing the epoxy resin can be free-radical initiated.

The polymeric, epoxy spray adhesive does not interfere with or contaminate the curing process of epoxy resins, wherein the adhesive instead cross links and/or otherwise structurally integrates and hardens along with the epoxy resin to form an integrated chemical structure.

It should be understood that the adhesive may be enclosed in a canister or other suitable container, or otherwise applied in a manner desirable relative to the workpiece.

The adhesive is preferably comprised of a formulated bisphenol A/epichlorohydrin epoxy resin base, optionally modified with tackifiers and adducts. The unique compatibility of the base of the adhesive with the epoxy resin of the target vacuum infusion procedure facilitates delivery of superior infusion results. That is, in a typical implementation, the adhesive is prepared by dissolving one or more epoxies in a solvent, preferably acetone. The solvent can be an organic ketone (e.g., acetone, methyl ethyl ketone), a solvent exempt from VOC regulation, or a combination thereof. The amount of solvent in the adhesive can be from 25 to 60 wt %, from 40 to 55 wt %, or from 47 to 52 wt % of adhesive. The solvent reduces the viscosity of the adhesive to enhance the spray can delivery of the adhesive. Acetone or other solvent can be quick to evaporate, exempt from VOC regulation, and therefore preferred as a carrier solvent. However, it should be recognized by one skilled in the art that other carrier solvents could be utilized.

The adhesive can contain a mixture of three epoxy resins: (1) a very high molecular weight epoxy resin with a weight per epoxide value of 1500 to 4000 grams per equivalent or 2300 to 3800 grams per equivalent, (2) a low viscosity (for example, 200 to 1500 cP at 25° C. or 800 to 1100 cP at 25° C.) epoxy polyacrylate resin with a weight per epoxide value of 200 to 350 grams per equivalent or 300 to 320 grams per equivalent, and (3) a carboxyl terminated butadiene nitrile (CTNB) modified epoxy resin with a weight per epoxide value of 180 to 1000 grams per equivalent or 195 to 210 grams per equivalent. Each of these three resins can be a bisphenol A (BPA)/epichlorohydrin resin.

Without being bound by any particular theory, an increase in the concentration of the low viscosity epoxy polyacrylate resin can increase the speed of the polymerization reaction while the CTNB modified epoxy resin provides flexibility and tack to the product and improves the green strength of the adhesive. The tack of the CTNB modified epoxy resin permits avoidance of a non-epoxy tackifier in the adhesive providing greater compatibility with the infusion resin.

The CTBN modified epoxy can be the major epoxy component in the adhesive. The ratio of the very high molecular weight epoxy resin to CTBN modified epoxy resin ranges from 0.4 parts by weight to 0.6 parts by weight to one part by weight CTBN modified epoxy resin. The ratio of the low viscosity epoxy polyacrylate resin to CTBN modified epoxy resin ranges from 0.05 parts by weight to 0.7 parts by weight to one part by weight CTBN modified epoxy resin. The total amount of epoxy resin can be from 40 to 75 wt %, from 45 to 60 wt %, or from 50 to 55 wt % of the adhesive. In particular, the adhesive contains 49.4 wt % epoxy resin.

Examples of epoxy resins that can be used in the adhesive include (1) a high molecular weight epoxy resin from the Epon® 1000 series such as Epon® 1009, a very high molecular weight epoxy resin with a weight per epoxide value of 2300 to 3800 grams per equivalent or Epon® 1007, a moderately high molecular weight epoxy resin with a weight per epoxide value of 1700 to 2200 grams per equivalent, (2) an epoxy acrylate from the Epon® 8000 series of epoxy acrylates such as Epon® 8111, an epoxy polyacrylate with a weight per epoxide value of 300 to 320 grams per equivalent and a viscosity of 800 to 1100 cP at 25° C., and (3) an Epon® 58000 CTBN modified epoxy such as Epon® 58901, a CTBN modified epoxy resin with a weight per epoxide value of 195 to 210 grams per equivalent. Epon® resins are BPA/epichlorohydrin resins available from Momentive Specialty Chemicals Inc. (Columbus, Ohio).

Other epoxy resins that contain a CTBN adduct include Epon® 58005 with a weight per epoxide value of 325 to 375 grams per equivalent, Epon® 58006 with a weight per epoxide value of 330 to 360 grams per equivalent, Epon® 58034 with a weight per epoxide value of 275 to 305 grams per equivalent, and Epon® 58120 with a weight per epoxide value of 850 to 1050 grams per equivalent. Additional epoxy resins include the Epon® 800 series with a weight per epoxide value of 165 to 725 grams per equivalent, the Epon® 1000 series with a weight per epoxide value of 450 to 3800 grams per equivalent, and the Epon® 2000 series with a weight per epoxide value of 625 to 1400 grams per equivalent.

Although a different combination or a single resin may alternately be utilized, the resin or resins can deliver improved toughness, elasticity, and tack to the adhesive. The epoxy resin used during infusion and the epoxy of the adhesive can be the same.

Additionally, one or more tackifiers can be included in the adhesive. Tackifier selection preferably optimizes stickiness or tack of the adhesive. Tackifiers in the form of aliphatic C-5 modified hydrocarbon resins or aliphatic C-5/C-9 aromatic modified hydrocarbon resins are preferred, but other commonly known tackifiers may perform suitably. Examples of aliphatic C-5 modified hydrocarbon resins or aliphatic C-5/C-9 aromatic modified hydrocarbon resin tackifiers include WINGTACK® 86 (available from Cray Valley, Exton, Pa.), Nevtac® 100 (available from Neville Chemical Company, Neville Island, Pa.), or Escorez® 5637 (available from ExxonMobil Chemical, Houston, Tex.). The amount of tackifier in the adhesive can be from 0 to 20 wt %, from 0 to 10 wt %, or from 0 to 5 wt %.

One or more adducts, such as amine hardeners or diamine hardeners, may be included in the adhesive, to pre-polymerize a portion of the epoxy. It should be noted that curing of the adhesive may actually start before introduction of curing agent to the epoxy resin. In such an embodiment, the complete "dissolving" of the epoxy adhesive into the chemical structure of the cured laminate is ensured, wherein potential flaws in the matrix are eliminated, or at least greatly diminished relative to prior adhesives.

When the composition is to be delivered by a spray can, as preferred, the adhesive is formulated with a lower viscosity to enable pressurized placement with gas for a satisfactory adhesive spray, wherein viscosity is preferably influenced and balanced in the formula of the adhesive with the addition of more acetone carrier. In the preferred embodiment, especially for spray delivery, fumed silica, for example CAB-O-SIL® (available from Cabot Corporation, Boston, Mass.) is added, resulting in maintenance of a uniform spray and promotion of improved short beam shear strength. The amount of fumed silica can be up to 5% by weight, up to 4% by weight, or up to 3% by weight.

To make the adhesive, the one or more epoxies, optional tackifiers, and optional adducts are dissolved in the solvent. If fumed silica is used, it is suspended in the mixture and does not dissolve. All ingredients are added to the solvent at one time, then mixed with mechanical agitation. For example, the amount of each component in the adhesive is 48 wt % acetone, 13 wt % Epon® 1009, 14 wt % Epon® 8111, 22 wt % Epon® 58901, and 3 wt % fumed silica.

In another embodiment, when the composition is packaged in a canister, a small amount of hydrocarbon gas, such as propane-isobutane or dimethyl ether, is used and pressurized with nitrogen or other suitable gas to a higher pressure. The amount of hydrocarbon gas can be from 0.1 lbs to 1 lb adhesive, from 0.5 lbs to 1 lb adhesive, or from 1 lb to 1 lb of adhesive. Hydrocarbon propellants are liquids while under pressure in the canister and dissolve in the adhesive blend. When pressure is released, they become gases and provide constant pressure for spraying.

Other suitable gases in lieu of nitrogen include carbon dioxide and argon. The amount of gas pressure used depends on the pressure rating of the canister. Typically, the maximum pressure that can be used is 220 psi. Normally this pressure is maximized to achieve the best spray characteristic.

In use, laminates, or composites, are preferably prepared from layers of carbon fiber material held together with the adhesive. These composites are vacuum infused with epoxy resin. Samples prepared according to such a process and with the adhesive, after curing, were subjected to testing using ASTM D 2334, "Standard Test Method for Short-Beam Strength of Polymer Matrix Composite Materials and Their Laminates," to determine the "short-beam strength of the high-modulus fiber-reinforced composite materials", wherein no weak spots were detected in the compositions formed using the adhesive. That is, the interlaminar shear strength was determined by comparative flexing of composite specimens by delivery of controlled forces thereto until breakage occurred, and confirmation of the structural integration of the adhesive into the cured laminate structure was realized.

EXAMPLE

Example 1: Shear Stress Testing Using No Adhesive, the Inventive Adhesive, and a Commercial Adhesive In order to test the efficacy of the epoxy adhesive, laminate samples were prepared and analyzed following a procedure similar to ASTM D 2334. Fiberglass laminate layers were prepared: first, with no adhesive, second, with the epoxy adhesive, and third, with representative multi-purpose aerosol adhesive, 3M SUPER 77®. Ten samples were tested for each variation. Maximum shear stress (MPa) repeatedly confirmed the unexpected benefits of the epoxy adhesive, as compared to the representative traditional, multi-purpose adhesive. Sample data and measured results are presented in FIG. 5, with graphical representation in FIG. 6. With strength recovery double that of a traditional adhesive, the performance of the adhesive, with 99% strength recovery, is unexpectedly synergistic and improved for use in epoxy laminate applications relative to the performance of a traditional adhesive, with a strength recovery of only about 49%.

In the procedure, laminates and fiberglass were thus either sprayed with the adhesive, sprayed with representative traditional adhesive, or placed together with no adhesive. The assembled laminates were placed into a vacuum bag, and epoxy resin and hardeners were appropriately introduced. A vacuum remained until resin curing was complete. The completed samples, of dimensional specifications as noted in FIG. 5, were subjected to short beam shear testing, with a failure load recorded for each sample, also as displayed in FIG. 5. The performance of the adhesive relative to the control epoxy laminate structure without adhesive was remarkable, and the magnitude of improvement of shear strength with the adhesive as compared to traditional adhesive was unexpected. The testing results indicate that the adhesive may be utilized in epoxy laminate applications essentially without impact on the resulting laminate structure.

Having thus described exemplary embodiments of the present apparatus and method, it should be noted by those skilled in the art that the within disclosures are exemplary only, and that various other alternatives, adaptations, and modifications may be made within the scope of the present disclosure. Accordingly, the present disclosure is not limited to the specific embodiments illustrated herein, but is limited only by the following claims.

The invention claimed is:

1. An adhesive composition, comprising:
   a mixture of epoxy resins dissolved in one or more solvents, wherein the mixture of epoxy resins comprises:
   (1) an epoxy resin with a weight per epoxide value of 1500 to 4000 grams per equivalent;
   (2) an epoxy polyacrylate resin with a weight per epoxide value of 200 to 350 grams per equivalent; and
   (3) a carboxyl terminated butadiene nitrile (CTNB) modified epoxy resin with a weight per epoxide value of 180 to 1000 grams per equivalent.

2. The adhesive composition of claim 1, wherein (1) comprises a bisphenol A (BPA)/epichlorohydrin resin.

3. The adhesive composition of claim 1, wherein (1), (2), and (3) are present in a combined amount of 40 to 75 wt % based on the weight of the adhesive composition.

4. The adhesive composition of claim 1, wherein the one or more solvents is an organic ketone.

5. The adhesive composition of claim 1, wherein the one or more solvents is acetone.

6. The adhesive composition of claim 1, wherein the one or more solvents is present in an amount of from 25 to 65 wt % based on the weight of the adhesive.

7. The adhesive composition of claim 1, further comprising fumed silica.

8. The adhesive composition of claim 7, wherein the fumed silica is present in an amount of up to 5 wt % of the adhesive.

9. The adhesive composition of claim 7, consisting of: 13 wt % of (1), 14 wt % of (2), 22 wt % of (3), 48 wt % of acetone, and 3 wt % of fumed silica, each wt % being based on the weight of the adhesive composition.

10. The adhesive composition of claim 1, wherein (2) and (3) comprise a derivative of bisphenol A/epichlorohydrin resin.

11. The adhesive composition of claim 1, wherein at least one of the one or more solvents comprises a ketone.

12. The adhesive composition of claim 1, wherein (1) has a weight per epoxide value of 2300 to 3800 grams per equivalent.

* * * * *